Patented Dec. 30, 1941

2,267,767

UNITED STATES PATENT OFFICE 2,267,767

MANUFACTURE OF CATALYSTS

Charles L. Thomas, Chicago, Ill., assignor to Universal Oil Products Company, Chicago, Ill., a corporation of Delaware No Drawing. Application October 24, 1940, Serial No. 362,589

5 Claims. (Cl. 252—251)

This invention relates to a method of manufacturing catalytic materials which are effective in catalyzing hydrocarbon conversion reactions. These reactions may include isomerization, dehydrogenation, polymerization, carbon-to-carbon scission whether applied to single compounds and simple mixtures thereof, or applied to reforming or cracking where the above mentioned reactions may be involved in varying degree.

In many commercial processes involving the use of catalysts it has been found desirable to dispose active catalysts upon relatively inactive supports rather than to employ masses composed entirely of the active catalyst. There are a number of reasons for this depending upon the specific process involved. In hydrocarbon conversison reactions, for example, the hydrocarbon vapors penetrate into the highly adsorptive materials and hydrocarbonaceous materials are deposited largely as a result of secondary reactions. Because of this deposit in the pores and on the surfaces of the catalytic masses, the processes are operated in cycle operations whereby periodic oxidation treatment is applied to remove the hydrocarbonaceous materials. In this regenerating treatment, however, the centers or cores of the catalyst masses become more or less permeated with residual materials rendering the interior rather impervious to processing and regenerating treatment. In addition to the formation of inert cores, the carbonaceous material which generally forms this core has a poor heat adsorption and transmitting capacity, and thus renders the mass less suitable for processing especially where the alternate reactions involved are endothermic and exothermic. It is among the objects of the present invention to more or less obviate difficulties of this character by the utilization of a method of preparing the active catalyst and disposing same on a suitable carrier.

In one specific embodiment, the present invention comprises preparing catalysts for organic and particularly hydrocarbon conversion reactions which consist in treating a substantially non-porous support with a non-aqueous solution of a metal alkoxide and an alkyl orthosilicate in proportions necessary for the formation of a hydrated silica-metal oxide composite having a major proportion of silica and a minor proportion of an activating metal oxide, hydrolyzing to form said hydrated oxide composite, drying and heating to a temperature of 900–1600° F.

According to my invention, relatively inert supports of numerous materials and various structural forms are treated for example with a non-aqueous solution of an alkyl silicate and an alkoxide compound of the remaining metal oxide component in order to deposit a metal oxide composite constituting the active catalyst material. The supporting material or base may constitute a metal or mineral as examples of inert materials generally and it may take the form of extensive surfaces or of particles having more or less uniform size and of regular or irregular shapes. Thus a metal support for example may be utilized as a sphere or particles of irregular shape having a suitable mesh size, or the surface may take the form of extended sheets or screens having openings of various size and shape. Generally speaking, a metal composing the support may be an alloyed ferric metal such as a stainless steel alloy or various other metal alloys which withstand the temperature utilized in the processing operations without changing its form or reacting with the materials in process. With respect to non-metallic supports any number of refractory materials are generally utilized such as kieselguhr, pumice, diatomaceous earth as representative of siliceous materials and bauxite, corundum as illustrative of the numerous aluminum-containing minerals.

The non-porous core or surfacing structure may be preliminarily treated in order to render it susceptible to deposition and adhesion of the active catalytic material. In the case of metals and siliceous materials both, the surfaces may be etched or otherwise roughed to remove the smooth surface. Where a quartz core is employed, for example, the surfaces may be etched by the use of hydrofluoric acid. Metal surfaces are treated to remove surface scale or deposits so that a clean surface is presented. The non-porous solid may even in some cases be coated with a material which serves as a binder between the core on the one hand and the deposited catalytic material on the other. As an example of this procedure a nitro-cellulose lacquer or its equivalent may be applied to the surface either by painting, spraying or dipping and subsequently drying. In subsequent treatment at high temperature, the binder having served its purpose in causing the adhesion of the support and deposited catalyst is decomposed.

Many composites of hydrous oxides are generally known which are valuable when properly prepared in accelerating various hydrocarbon conversion reactions. Notable amongst these are combinations of silica with alumina, zirconia, thoria, vanadia, magnesia and other metal oxides which are active in cracking and/or reforming reactions. According to the process of this invention, these oxides are prepared by disposing alkyl ortho-silicate and the alkoxy compounds of the remaining component or components, causing the reaction thereof by means of hydrolysis and then removing the solvent. Specific procedures are given in subsequent examples. Various proportions of the oxide components may be employed, the more frequent practice being to employ major proportions of silica and minor proportions of the added activating oxides. Thus, in the preparation of silica-alumina catalysts approximately 5-30% of alumina is preferably composited with the silica. Smaller and higher proportions of alumina may be utilized but generally speaking without the same catalytic effectiveness.

Various types of hydrocarbon conversion reactions take place in the presence of the supported cracking and reforming catalysts of this invention depending partly upon the temperature, pressure and time conditions, and partly upon the hydrocarbon oil processed. The reactions may include carbon to carbon cleavage, cyclization, isomerization, dehydrogenation, hydrogenation, hydrogen transfer and desulfurization reactions. In the case of the higher boiling hydrocarbons for example there may be a cleavage of long chain carbon-to-carbon bonds and isomerization reactions may also occur as a result of which the lower boiling hydrocarbons formed are of a more highly branched chain nature. Also hydro-aromatic hydrocarbons present in the oil undergoing decomposition or formed therein by the cyclization of olefins may undergo dehydrogenation to form aromatic hydrocarbons, and the hydrogen liberated in these reactions may combine with olefinic hydrocarbons present during reaction to form more saturated hydrocarbons. The latter reactions tend to occur at the lower temperatures in the range of operating conditions given below whereas more unsaturated hydrocarbons, particularly olefins are produced in large proportions at the higher temperatures employed. The hydrocarbons generally are of a more branched chain structure than are produced in thermal cracking treatment. The temperatures employed may be within the approximate range of 700–1100° F. more or less and the pressures employed may range from approximately atmospheric to 500 pounds or more per square inch.

The following specific example is given to illustrate the process of the invention in catalyst preparation and also the use of this catalyst. The process should not be considered as limited to this example of catalyst preparation or the components and proportions thereof since these are only illustrative of the novelty and utility of the invention.

A supported catalyst having the catalyst composition of approximately $100SiO_2:10Al_2O_3$ was prepared as follows by utilizing a wire screen as a support and silica-alumina as the catalyst in the proportions of approximately 100 mols of silica with 10 mols of alumina. The screen used was woven of commercial 18–8 stainless steel and contained 80 mesh to the inch. The screen was dipped in an alcoholic solution of aluminum n-butoxide $(Al(OBu)_3)$ and ethyl orthosilicate, the amount of these components being in the ratio required for the formation of silica-alumina in the above proportions. After dipping, the screen was exposed to moisture for several days whereupon the reagents were hydrolyzed to form the hydrous oxides of silica and alumina. The screen was then dried and heated to approximately 900–1000° F.

The above screen supported catalyst was cut into discs and mounted into a catalyst reactor so that each screen was normal to the direction of vapor flow and were approximately 1/8 inch apart. When processing vapors of a Pennsylvania gas oil at 932° F. and substantially atmospheric pressure in this reactor using a space velocity of approximately 2 and one hour operating cycles of processing and regeneration, 16 volume per cent of gasoline based on the oil charged was produced in a single pass and having an octane number of approximately 80. In a recycling operation yields as high as 70% or more of this gasoline is obtainable.

I claim as my invention:

1. A process for preparing a supported catalyst for hydrocarbon conversion reactions which comprises treating a substantially inert support with a non-aqueous solution of an alkyl silicate and a metal alkoxide, hydrolyzing said compounds to deposit hydrated silica and a hydrated metal oxide upon said substantially inert support, and drying.

2. A process for preparing a supported catalyst for hydrocarbon conversion reactions which comprises treating a metallic support with a non-aqueous solution of an alkyl silicate and a metal alkoxide, hydrolyzing said compounds to deposit hydrated silica and a hydrated metal oxide upon said substantially inert support, and drying.

3. A process for preparing a supported catalyst for hydrocarbon conversion reactions which comprises treating a refractory support with a non-aqueous solution of an alkyl silicate and a metal alkoxide, hydrolyzing said compounds to deposit hydrated silica and a hydrated metal oxide upon said substantially inert support, and drying.

4. A process for preparing a supported catalyst for hydrocarbon conversion reactions which comprises treating a substantially inert support with a non-aqueous solution of ethyl-orthosilicate and aluminum butoxide, hydrolzing said compounds to deposit hydrated silica and a hydrated metal oxide upon said substantially inert support, and drying.

5. A process for preparing a supported catalyst for hydrocarbon conversion reactions which comprises treating a substantially inert support with a non-aqueous solution of an alkyl silicate and a metal alkoxide, hydrolyzing said compounds to deposit hydrated silica and a hydrated metal oxide upon said substantially inert support, drying and heating at a temperature from about 900° F. to about 1600° F.

CHARLES L. THOMAS.